A. Schenck,
Grain Basket,
Nº 39,426. Patented Aug. 4, 1863.
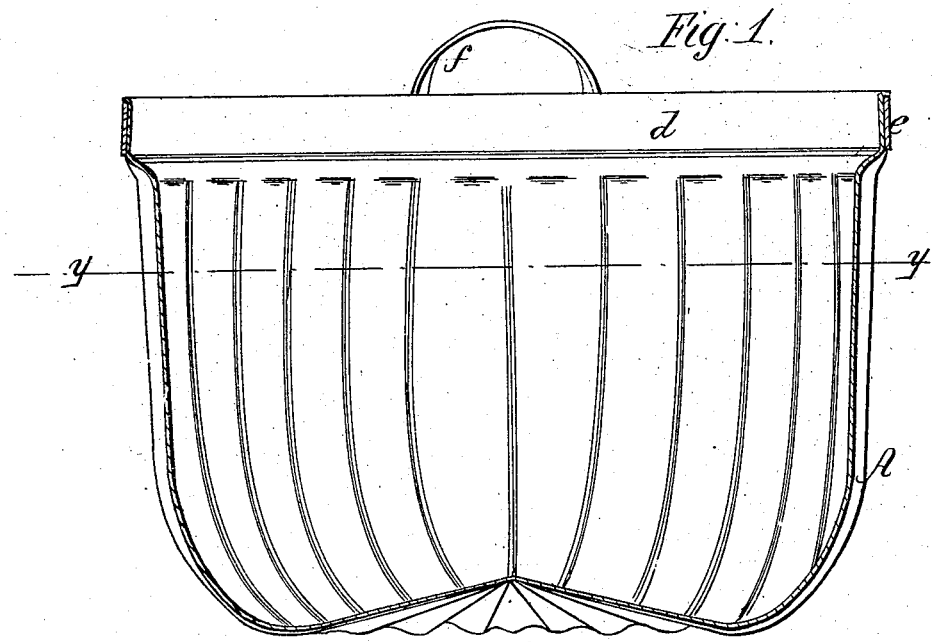
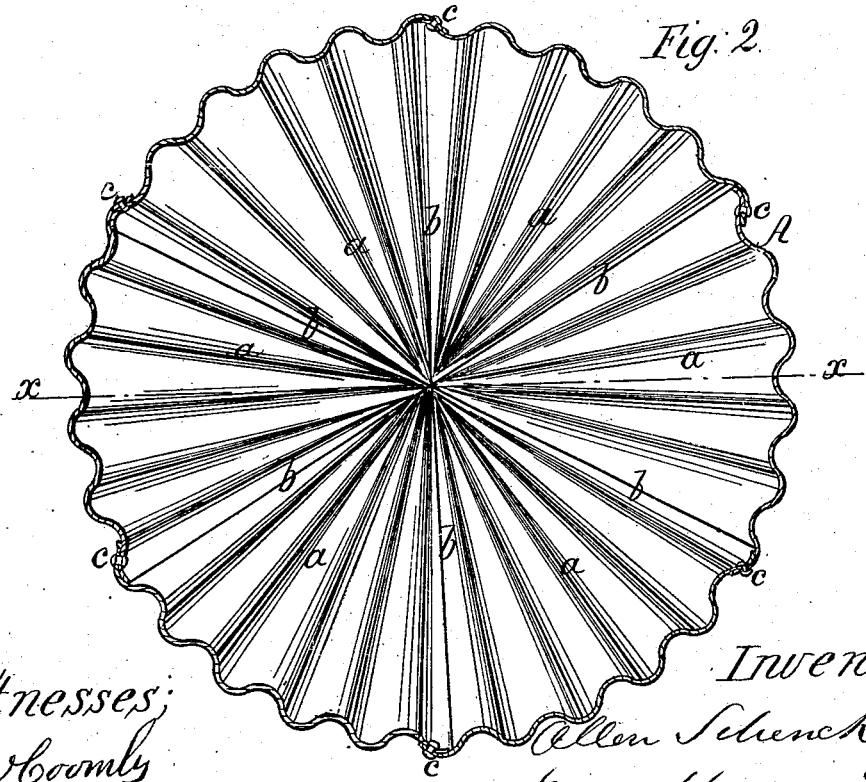
Witnesses:
J W Coombs
G W Reeh
Inventor:
Allen Schenck
per Munn & C
attys

UNITED STATES PATENT OFFICE.

ALLEN SCHENCK, OF CHICAGO, ILLINOIS.

IMPROVEMENT IN METALLIC BASKETS.

Specification forming part of Letters Patent No. 39,426, dated August 4, 1863.

*To all whom it may concern:*

Be it known that I, ALLEN SCHENCK, of Chicago, in the county of Cook and State of Illinois, have invented a new and improved basket or metal vessel designed as a substitute for baskets used for household and agricultural purposes; and I do hereby declare that the following is a full, clear, and exact description of the same, reference being had to the accompanying drawings, making a part of this specification, in which—

Figure 1 is a vertical central section of my invention, taken in the line $x$ $x$, Fig. 2; Fig. 2, a horizontal section of the same, taken in the line $y$ $y$, Fig. 1.

Similar letters of reference indicate corresponding parts in the two figures.

This invention consists in constructing the basket or vessel of sheet metal. Zinc or galvanized iron will answer the purpose, the sheet metal being cut in sections of suitable dimensions and shape, and swaged in corrugated or fluted form, and then riveted or soldered together, as hereinafter set forth.

The invention is designed as a substitute for the ordinary baskets used for household and agricultural purposes and for measures of capacity.

To enable those skilled in the art to fully understand and construct my invention, I will proceed to describe it.

A represents a basket or vessel constructed according to my invention, and of a form corresponding to what is commonly termed a "bushel basket," used for agricultural purposes and as a measure of capacity. This basket or vessel A is composed of six sections, $a$, cut out of sheet metal, and of such a form that when swaged or bent they will correspond each to a sixth of the basket cut from the center of the bottom outward, as indicated by the lines $b$ in Fig. 2. The sections $a$ are corrugated or fluted, so as to be of sinuous form in their horizontal section, as shown clearly in Fig. 2, and the edges of the sections are lapped and secured together by rivets $c$, or by solder. The corrugations of the sections $a$ do not extend entirely up to their tops, a smooth surface, $d$, being allowed at their upper ends for the purpose of receiving a wooden or metal hoop, $e$, as shown in Fig. 1. The top of the basket is provided with two handles, $f$, which may be either of wood or metal.

This basket or vessel may be economically constructed. The sections $a$ may be bent in proper form and swaged at one operation. The corrugating of the sections renders the basket or vessel stiff and firm with quite thin metal and renders the article light as well as durable. It is believed that they will supersede the ordinary baskets in common use for household and agricultural purposes.

Having thus described my invention, I claim as new and desire to secure by Letters Patent as an improved article of manufacture—

A sheet-metal basket or vessel composed of a series of sections, $a$, bent or swaged in proper form, corrugated or fluted, and secured together by rivets or solder, substantially as herein set forth.

ALLEN SCHENCK.

Witnesses:
W. S. BRACKEN,
W. V. YARWOOD.